(12) United States Patent  
Park

(10) Patent No.: US 6,422,052 B2
(45) Date of Patent: Jul. 23, 2002

(54) DEVICE FOR FORMING CUTTING BLADE FOR PRINTS

(76) Inventor: Hong Soon Park, 433-13, Mangwon 2-dong, Mapu-ku, Seoul 121-232 (KR)

( * ) Notice: Subject to any disclaimer, the term of this patent is extended or adjusted under 35 U.S.C. 154(b) by 0 days.

(21) Appl. No.: 09/899,866

(22) Filed: Jul. 6, 2001

Related U.S. Application Data

(63) Continuation of application No. 09/711,633, filed on Nov. 13, 2000, which is a continuation of application No. 09/355,495, filed as application No. PCT/KR98/00155 on Jun. 11, 1998, now Pat. No. 6,145,359.

(51) Int. Cl.[7] .................................................. B21D 3/04
(52) U.S. Cl. ............................. 72/307; 72/319; 72/428
(58) Field of Search .............................. 72/307, 379.2, 72/317, 388, 987, 462, 428, 319, 316, 322, 467, 468

(56) References Cited

U.S. PATENT DOCUMENTS

| 796,335 A | * | 8/1905 | Johnston | 72/468 |
|---|---|---|---|---|
| 922,349 A | * | 5/1909 | Sinclair | 72/467 |
| 3,466,707 A | * | 9/1969 | Click | 72/317 |
| 4,773,284 A | | 9/1988 | Archer et al. | |
| 5,461,893 A | | 10/1995 | Tyler | |
| 5,787,750 A | * | 8/1998 | Song | 72/307 |
| 5,870,919 A | | 2/1999 | Song | |
| 5,881,591 A | * | 3/1999 | Ondracek | 72/307 |
| 6,003,358 A | * | 12/1999 | Lipari | 72/307 |
| 6,128,940 A | | 10/2000 | Song | |

FOREIGN PATENT DOCUMENTS

| EP | 0088576 | 9/1983 | | |
|---|---|---|---|---|
| GB | 2008999 A | * | 6/1979 | 72/307 |
| JP | S62-181835 | | 8/1987 | 72/307 |

* cited by examiner

*Primary Examiner*—Daniel C. Crane
(74) *Attorney, Agent, or Firm*—Gibbons, Del Deo, Dolan, Griffinger & Vecchione

(57) ABSTRACT

A device for forming a cutting blade for prints is disclosed. The device of this invention forms cutting blades by appropriately bending and cutting a metal strip into desired blades through integrated work regardless of a difference in the size of metal strips. The device is also provided with changeable jigs, thus being capable of forming bridge notches having different intervals, widths and configurations. The device has one vertically movable bending pin and one swing cutter. The bending pin is capable of quickly bending a metal strip into a desired configuration, while the swing cutter finely and precisely cuts the metal strip into cutting blades. The device also quickly produces high precision cutting blades, thus improving productivity and reducing the cost of the cutting blades.

9 Claims, 18 Drawing Sheets

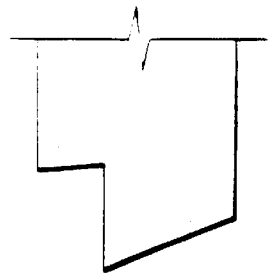
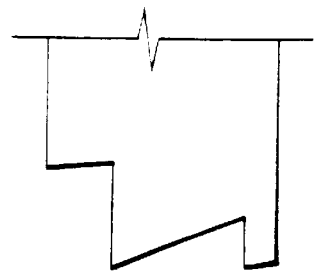
FIG. 5A    FIG. 5B
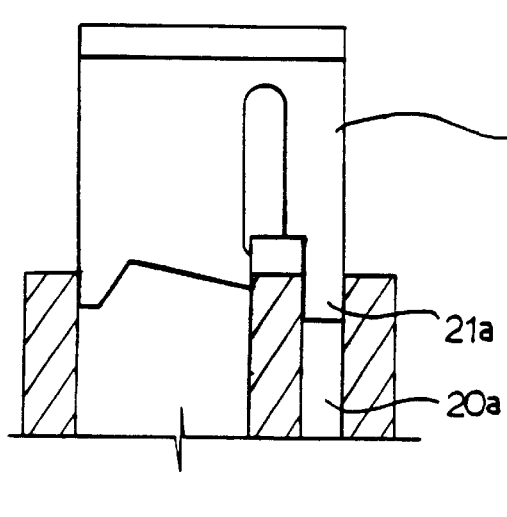
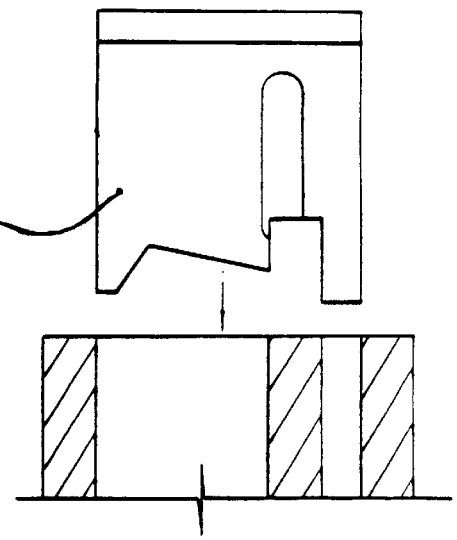
FIG. 6A    FIG. 6B

FIG. 25
FIG. 26
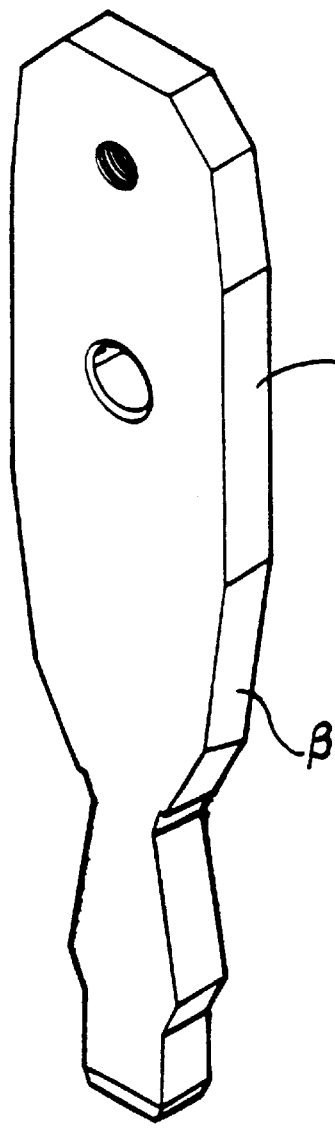
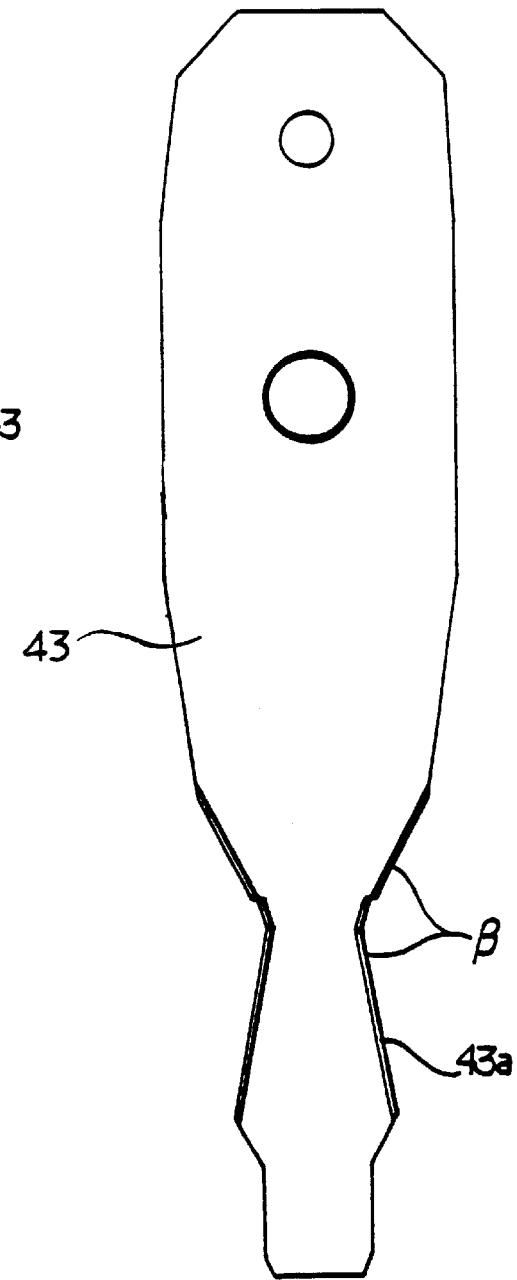

DEVICE FOR FORMING CUTTING BLADE FOR PRINTS

Prior Applications

This application is a continuation of U.S. Ser. No. 09/711,633 filed Nov. 13, 2000, which is a continuation of U.S. Ser. No. 09/355,495 filed Jul. 28, 1999 (U.S. Pat. No. 6,145,359), which is a 371 of PCT/KR98/00155 filed Jun. 11, 1998.

TECHNICAL FIELD

The present invention relates, in general, to a device for forming a cutting blade for prints and, more particularly, to a device capable of forming such a cutting blade by appropriately bending and cutting a metal strip into desired blades through integrated work regardless of a difference in the size of metal strips.

BACKGROUND ART

In order to produce various flat prints or printed packing materials, such as paper boxes or thermoplastic films, it is necessary for flat prints or films to be cut along a designed cutting line, and for box-shaped packing materials to be cut along a designed cutting line of a printed paper board prior to forming the board into a box.

Such a cutting process for producing flat prints, paper boxes, or thermoplastic films has to be performed using a single-edged cutting blade which extends along a desired cutting line. Such a cutting blade is set on a flat wood block in a way such that the blade has a uniform height. In such a case, the sharpened surface of the single edge of the blade faces outward. The wood block, with the cutting blade, is installed on a press which is used for cutting such flat prints or packing materials.

Typical cutting blades are produced by cutting a thin special steel strip into pieces. Such a steel strip has a band-shaped configuration and is sharpened at one edge prior to being subjected to the bending and cutting processes. Such a metal strip has to be bent and cut into cutting blades which individually form a designed cutting line along which flat prints or packing materials are cut by the cutting blade. After the metal strip is bent and cut into cutting blades, one or more cutting blades are set on a wood block. Therefore, it is primarily necessary to precisely bend and cut the metal strip into cutting blades. In addition, the metal strip is also processed through a plurality of sub-processes as follows.

For example, the metal strip has to be regularly notched at the lower edge opposite to the sharpened edge, thus forming bridge notches at the lower edge. Such bridge notches are for firmly holding the position of a cutting blade when the blade is set on a wood block. That is, the bridge notches almost completely prevent the set position of the cutting blade on the wood block from being unexpectedly deformed due to external impact. Sometimes, it is necessary to form a plurality of V-notches along the sharpened edge of the metal strip, thus form a cutting blade which is preferably used for forming perforated lines on prints, such as stamps. Sometimes, the metal strip may be bent at right angles. In such a case, a bending slot has to be transversely formed on a side surface of the metal strip prior to bending the metal strip at right angles. When the metal strip has to be precisely bent, it is preferable to bend the metal strip manually rather than mechanically and this forces the metal strip to be subjected to a marking process of forming bending points on the metal strip prior to manually bending the metal strip.

Of course, the above-mentioned sub-processes of forming bridge notches, V-notches, bending slots and bending points are well known to those skilled in the art. However, in known blade forming devices, such processes are not performed through integrated work, but are separately and selectively performed, so that the known devices fail to achieve desired precision and reduce productivity, and increase the production cost of the cutting blades.

In the known devices, the process of cutting the metal strip into desired cutting blades is separately performed from the above sub-processes, thus more reducing productivity and increasing the production cost of the cutting blades.

In an effort to overcome such problems, a long metal strip, with a sharpened edge, may be wound around a feeding roll so as to be forcibly and continuously fed from the roll to a bending nozzle. At a position around the bending nozzle, the metal strip comes into contact with a plurality of bending pins which are used for bending the metal strip into a desired configuration.

As well known to those skilled in the art, such a bending process, using a bending pin, is numerically controlled by a computer. That is, a plurality of bending pins are positioned around the bending nozzle and are precisely rotated in opposite directions in response to control signals output from the computer, thus bending the metal strip coming out from the bending nozzle. Such a bending process may be referred to, for example, in Japanese Patent Laid-open Publication No. Heisei. 8-99,123.

In the typical blade forming devices, the metal strip may be cut into a plurality of pieces, having designed lengths, before the metal strip reaches the bending nozzle. In a brief description, the metal strip may be cut into pieces before a bending process. Alternatively, the metal strip may be cut into pieces after a bending process as disclosed in Japanese Patent Laid-open Publication No. Heisei. 8-243,834. In this Japanese Patent, the metal strip, coming out from the bending nozzle, is repeatedly bent in opposite directions until the metal strip is cut due to fatigue fracture.

However, the typical blade forming devices are problematic in that they fail to produce high quality cutting blades and cannot produce the cutting blades through integrated work.

That is, the configuration of the bridge cutting jig, installed in the typical devices, is fixed, so that it is almost impossible to change the intervals or configuration of the bridge notches of the metal strip. In addition, the typical devices have to separately perform a machining process of forming such bridge notches on the metal strip, so that the devices reduce productivity and increase the production cost of the cutting blades.

Another problem of the typical blade forming devices is caused by the bending pins used for bending the metal strip into a desired configuration. That is, the bending pins have to be held by a complex holding means, thus complicating the construction of the cutting blade forming device. In addition, it is almost impossible to precisely adjust the bending angle of the bending pins without causing error.

When the metal strip is subjected to a bending process after a cutting process, the cutting blades have accumulative error during the bending process, so that the cutting blades have a low precision.

In addition, when at least one of the bending pins is frictionally abraded, it is almost impossible to precisely center the bending pins. In such a case, the bending pins have to be repositioned one by one and this reduces work efficiency while bending the metal strip.

During a bending process using the typical device, the sharpened edge of the metal strip comes into contact with the bending pins, so that the sharpened edge may be damaged.

The most important problem, experienced in the typical blade forming devices, is caused during a cutting process. That is, since the metal strip from a bending process is cut into pieces by repeatedly bending the metal strip in opposite directions until the metal strip is cut due to fatigue fracture, the edge, along which the metal strip is cut, is not smooth, but is exceedingly rough with burrs, thus spoiling the appearance of the cutting blades. In order to remove such burrs from the cutting blades, the blades have to be subjected to an additional grinding process. In addition, after the metal strip is cut into pieces, it is necessary to finally machine the pieces so as to produce resulting blades and this forces the metal strip to be cut into pieces with machining allowance. rue to such machining allowance, it is almost impossible to produce high precision blades.

Therefore, it is preferable to perform the processes of forming the bridge notches on a metal strip, bending the metal strip into a designed configuration and cutting the metal strip into cutting blades through integrated work while precisely adjusting the bending angle of the bending pins and finely cutting the metal strip into cutting blades. In such a case, the. cutting blades from the cutting process may be free from any additional machining process.

In addition, it is necessary for the blade forming devices to be flexibly used for processing metal strips having different sizes. The blade forming devices also have to be designed for effectively bending the metal strips into different configurations when necessary.

DISCLOSURE OF THE INVENTION

Accordingly, the present invention has been made keeping in mind the above problems occurring in the prior art, and an object of the present invention is to provide a device for forming a cutting blade for prints, which is provided with changeable jigs, thus being capable of forming bridge notches having different intervals an configurations, and which forms cutting blades by appropriately bending and cutting a metal strip into desired blades through integrated work regardless of a difference in the size of metal strips.

Another object of the present invention is to provide a device for forming a cutting blade for prints, which has one or a plurality of vertically movable bending pins and one swing cutter, the bending pin being capable of quickly bending a metal strip into a desired configuration and the swing cutter finely and precisely cutting the metal strip into cutting blades.

A further object of the present invention is to provide a device for forming a cutting blade for prints, which quickly produces high precision cutting blades, thus improving productivity and reducing the cost of the cutting blades.

In order to accomplish the above object, the present invention provides a device for forming a cutting blade for prints, comprising: a strip roll unit having a sufficient amount of metal strip and being rotatable in a direction by intermittent drive means, thus supplying the metal strip at a constant rate; guide rollers horizontally and vertically guiding and unbending the metal strip from the strip roll unit; two guide blocks provided in front of the roll unit and adapted for guiding the metal strip from the roll unit; a bridge cutting mold detachably and selectively installed at one side of the two guide blocks and used for forming bridge notches on the metal strip, the bridge cutting mold comprising: a housing having both a strip passing hole and a jig guide slot, the strip passing hole perpendicularly meeting the jig guide slot; and a spring-biased jig movably positioned in the jig guide slot, thus selectively and quickly movable in the jig guide slot so as to form the bridge notches on the metal strip passing through the strip passing hole; a guide bending block provided in front of the bridge cutting mold and having a bending nozzle used for distributing the metal strip from the bridge cutting mold; a guide bending pin vertically positioned in front of the bending nozzle, the bending pin being vertically and controllably movable and rotatable in opposite directions, thus bending the metal strip from the bending nozzle into a desired pattern; a carrier movably held by two vertical guide rails standing in front of the bending pin, the carrier being movable downward under the guide of the two guide rails by a first cylinder actuator in response to a bending process ending signal; a strip holder mounted to a bottom center of the carrier and adapted for vertically holding the metal strip from the bending pin; a swing cutter hinged to the carrier and positioned in front of the strip holder, the swing cutter being selectively rotated by a second cylinder actuator in accordance with a detected angle of the metal strip, thus being positioned at a cutting process waiting position; a table provided with a slot for selectively holding a lower end of the strip holder with the carrier fully descending, the table also having a horizontal guide groove in front of the slot; and a movable piece slidably set in the horizontal guide groove of the table and having a locking slot at a top surface, the movable piece being quickly movable in opposite directions in the guide groove with a lower end of the cutter being held the locking slot of the movable piece, thus quickly cutting the metal strip into cutting blades.

BRIEF DESCRIPTION OF THE DRAWINGS

The above and other objects, features and other advantages of the present invention will be more clearly understood from the following detailed description taken in conjunction with the accompanying drawings, in which:

FIGS. 5A and 5B are views of typical bridge cutting jigs;

FIGS. 6A and 6B are views showing the operation and configuration of the bridge cutting jig used in the device of this invention;

FIG. 25 is a perspective view of the swing cutter of this invention;

FIG. 26 is a front view of the swing cutter of FIG. 25;

BEST MODE FOR CARRYING OUT THE INVENTION

Figure 1:
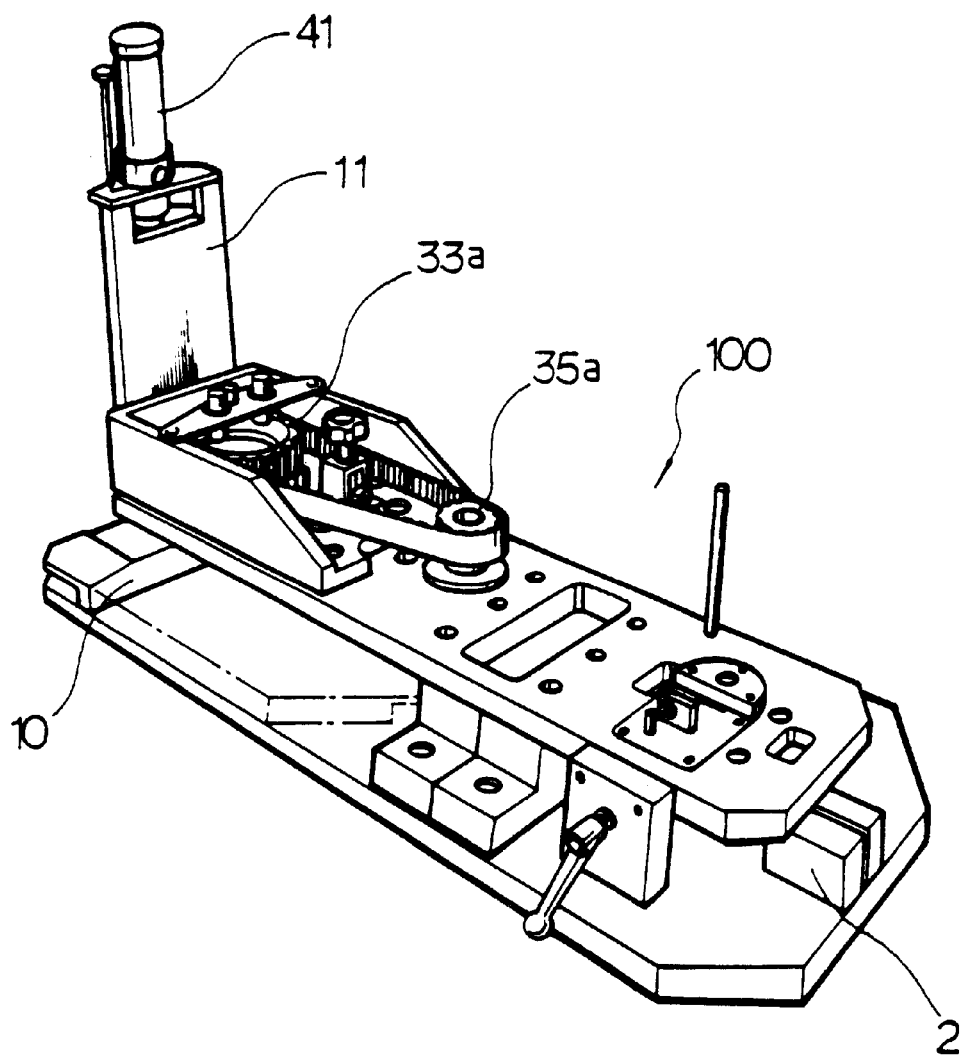
FIG. 1 is a perspective view of a blade forming device in accordance with the preferred embodiment of the present invention.
Figure 2:
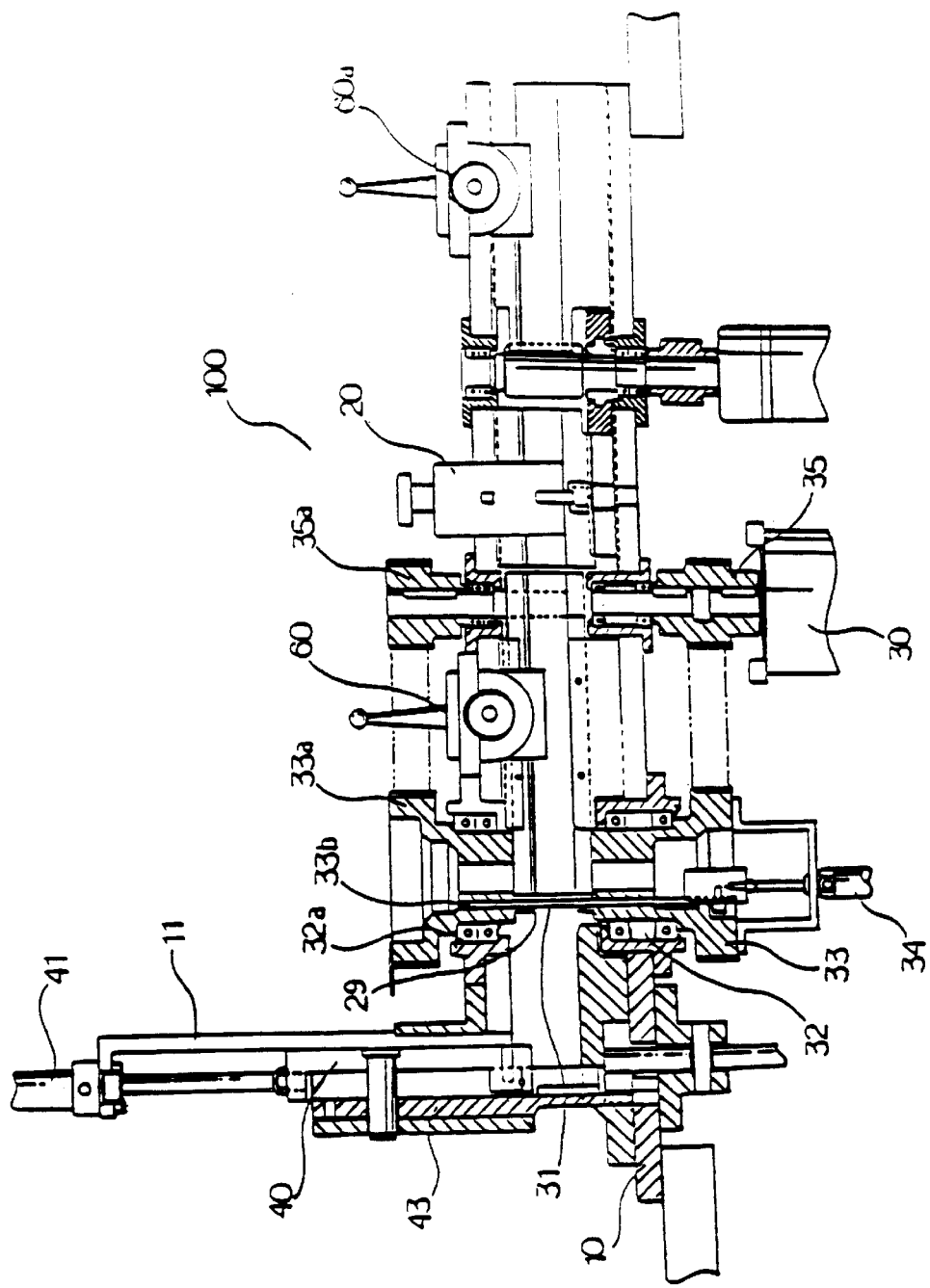
FIG. 2 is a longitudinal sectioned view showing the construction of the device of FIG. 1.

FIG. 1 is a perspective view of the blade forming device in accordance with the preferred embodiment of the present invention. FIG. 2 is a sectional view showing the construction of the device of FIG. 1.

In accordance with the present invention, a metal strip 1, which is the material of cutting blades and is previously sharpened at one edge, is installed on the device 100 and is continuously fed to bending and cutting units of the device as follows.

Figure 3:
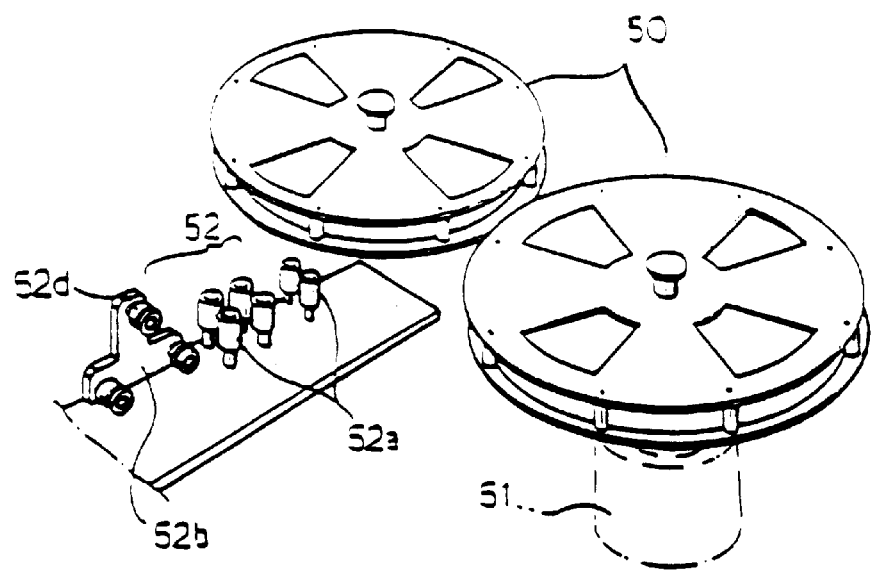
FIG. 3 is a perspective view showing a metal strip roll unit with a plurality of guide rollers being arranged at the front of the roll unit in accordance with the present invention.

That is, a table 10 forms the base surface of the device 100 and is provided with a strip roll unit at an appropriate position. As shown in FIG. 3, the above roll unit comprises at least two rolls 50, which are positioned aside each other and individually have a sufficient amount of metal strip 1. The above rolls 50 are operated by an intermittent drive means, such as a stepping motor 51, thus being rotatable in a direction and feeding the metal strip 1 to a bridge cutting position at a constant rate.

The above rolls 50 are designed for being rotatable in opposite directions, so that either of the rolls 50 smoothly feeds the metal strip 1 to the bridge cutting position even when the metal strip 1 is wound around the rolls 50 in opposite directions. Since the strip roll unit of the device 100 comprises two or more rolls 50, it is possible to increase the amount of metal strip 1 installed on the device 100 and allow differently sized metal strips 1 to be installed on the device 100 at the same time when necessary.

In order to guide the metal strip 1 from either of the rolls 50 to the bridge cutting position, two guide blocks 2 are provided in front of the rolls 50 with a plurality of guide rollers 52 being arranged between the two blocks 2. Due to the guide rollers 52, it is possible to feed the metal strip 1 from either roll 50 to the mold 20 at a predetermined feeding rate.

During the operation of the device 100, a predetermined length of the metal strip 1 moves forward by the rotating force of the stepping motor 51 under the guide of the guide blocks 2. When the strip 1 reaches the bridge cutting position, a predetermined number of bridge notches 1a are formed on the lower edge of the strip 1. In order to form such bridge notches 1a, a bridge cutting mold 20 has to be installed on the device 100. In order to install the mold 20 on the device 100, one of the two guide blocks 2 is movable in order to form an opening for installing the bridge cutting mold 20 on the device 100. Alternately, the top of an external casing, covering the guide blocks 2, may be opened prior to installing the bridge cutting mold 20 onto the device 100 from the top of the device 100.

Of course, it should be understood that the device 100 may be provided with two or more openings for bridge cutting molds. In such a case, the openings for the bridge cutting molds are positioned approximate to each other and seat two or more bridge cutting molds, having different functions, on the device 100 at the same time.

Figure 18:
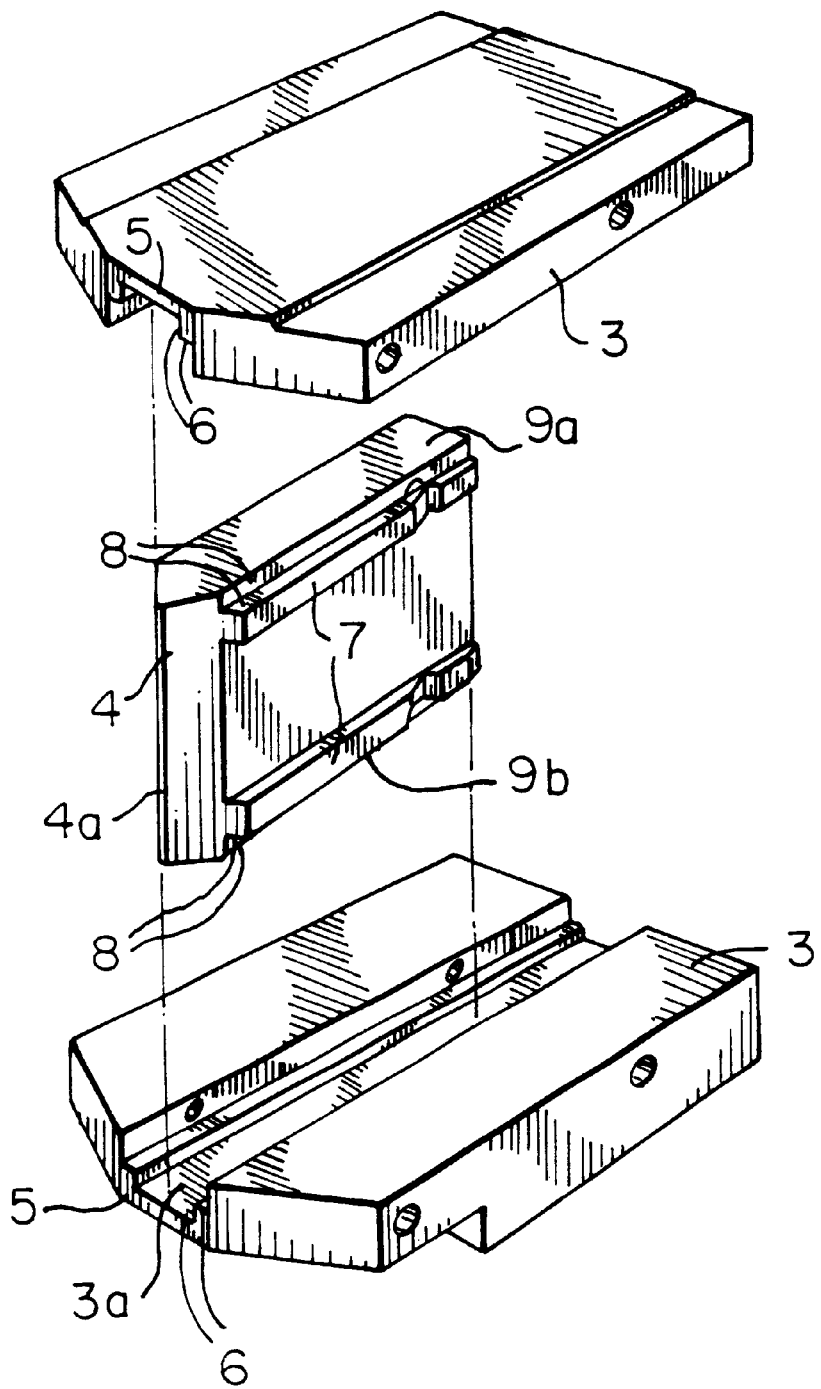
FIG. 18 shows an exploded perspective view showing top and bottom plates which are oppositely arranged on the device of this invention with a bending block being vertically positioned between the two plates.
Figure 19:
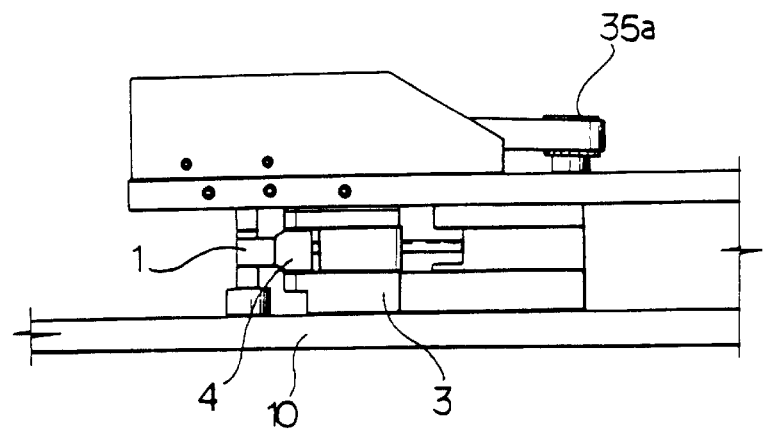
FIG. 19 is a side view showing the front portion of the device with the bending block of FIG. 18.

The casing for the guide blocks 2 comprises two plates: top and bottom plates 3, which are oppositely arranged on the device 100 with a bending block 4 being vertically positioned between the two plates 3 as shown in FIGS. 18 and 19. Each of the two plates 3 has a longitudinal fitting channel 3a at the inside surface, thus allowing the top and bottom sides of the bending block 4 to be held by the channels 3a of the two plates 3. The above casing, comprising the two plates 3 and the bending block 4, is arranged on the device 100 in a way such that the bending block 4 is horizontally aligned with the strip outlet of the two guide blocks 2.

The channels 3a are defined by an elongated configuration 5 that has plate engagement surfaces 6. The bending block 4 has a configuration 7 that has block engagement surfaces 8. The plate engagement surfaces 6 and the block engagement surfaces 8 are configured to complement each other so as engage each other in a complementary manner as one side 9a of the bending block 4 is fitted into one of the channels 3a of the plates 3 and other side 9b of the bending block is fitted into the other of the channels 3a of the other of the plates 3.

The above bending block 4 has a bending nozzle 4a at the front end, so that the metal strip 1 from the bridge cutting mold 20 is inserted into the bending nozzle 4a. In the present invention, the bending block 4 may be changed with another block 4 in accordance with the size and configuration of the metal strip 1. That is, in the device 100 of this invention, the bending block 4 is changeable, so that it is possible to change the type of the bending nozzle 4a in accordance with the size and configuration of the metal strip 1. Such a changeable bending block 4 is also held by specified plates 3, so that it is necessary for the plates 3 to be changed along with the bending block 4.

During the operation of the device 100, the metal strip 1 is continuously distributed from the bending nozzle 4a of the block 4 under the control of a numerical control program prior to being bent. One or a plurality of guide bending pins 31 are movably positioned at a side of the front end of the bending block 4 in a way such that the pin 31 is vertically movable. The above pin 31 is held by two gears at the top and bottom ends and is rotatable in opposite directions by a reversible stepping motor 30.

In such a case, two removable compression rollers 60 and 60a are provided at appropriate positions relative to the guide blocks 2. In the present invention, it is preferable to position the two rollers 60 and 60a at the inlet and outlet of the guide blocks 2, respectively. The two rollers 60 and 60a press the leading portion of the metal strip 1 at an appropriate pressure, thus allowing the metal strip 1 from the guide blocks 2 to move while maintaining a height.

Two guide rails 11, each having a predetermined length, vertically and oppositely stand at a position outside the bending nozzle 4a. A first cylinder actuator 41 is vertically positioned between the two guide rails 11. The first cylinder actuator 41 is operable in accordance with a bending process ending signal. The piston of the above actuator 41 is coupled to a movable carrier 40, so that the carrier 40 is vertically slidable under the guide of the two guide rails 11.

A strip holder 42 is screwed to the bottom center of the above carrier 40, so that the holder 42 is changeable with another one. The above strip holder 42 is vertically slitted upwardly from the lower end, thus having a vertical slit which has width and depth similar to thickness and width of the metal strip 1. A swing cutter 43 is hinged to the carrier 40 and is positioned at the front of the above strip holder 42 with a fine gap being formed between the cutter 43 and the holder 42. The above swing cutter 43 is operated by a second cylinder actuator 44 which is horizontally positioned at a side of the carrier 40. The above actuator 44 operates the swing cutter 43 in accordance with a detected angle of the metal strip 1 or a preset program. When the carrier 40 descends under the guide of the rails 11, the strip holder 42 primarily holds the metal strip 1 In such a case, the position of the strip holder 42 is fixed so as to almost completely prevent the metal strip 1 from being moved during a cutting process. In order to fix the strip holder 42, a slot 45 is formed at the front end of the table 10. A horizontal guide groove 46 is formed at the front of the slot 45. Slidably set in the above guide groove 46 is a movable piece 48 which has a locking slot 47 at the top surface. The movable piece 48 holds the lower end of the wing cutter 43 at the locking slot 47. The above movable piece 48 is coupled to a cylinder actuator inside the table 10 through a link motion, so that the piece 48 is movable to the left or right inside the guide groove 46. The swing cutter 43 is thus quickly rotated in opposite directions by the second actuator 44 and finely cuts the metal strip 1 into cutting blades.

FIG. 3 is a perspective view showing a metal strip roll unit with a plurality of guide rollers 52 being arranged at the front of the roll unit in accordance with the present invention.

As shown in FIG. 3, the guide rollers 52 consist of a plurality of horizontal guide rollers 52a and a plurality of vertical guide rollers 52b. The guide rollers 52 guide the metal strip 1 from the strip roll unit 50 to the gap between the two guide blocks 2. The roller 52c located between horizontal guide rollers 52a unbends the metal strip 1 from the strip roll unit 50 by moving right and left. The roller 52d above the vertical guide rollers 52b unbends the metal strip 1 from the strip roll unit 50 by moving up and down.

Figure 4:
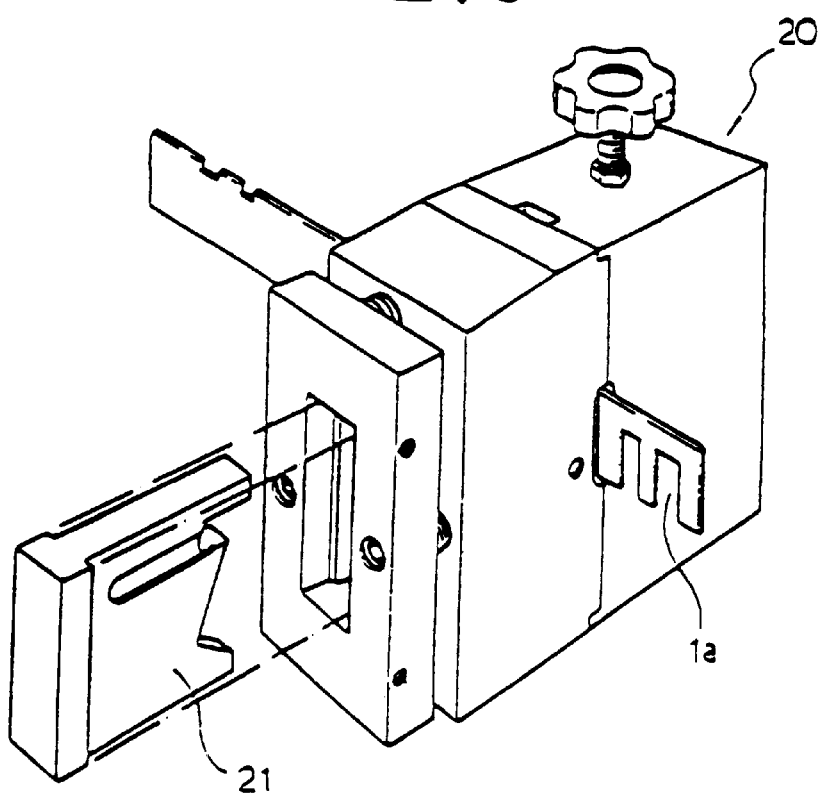
FIG. 4 is a perspective view showing a bridge cutting mold and a bridge cutting jig used in the device of this invention.

FIG. 4 is a perspective view showing the construction of a bridge cutting mold which is changeably set in the opening between the two guide blocks 2. FIGS. 5A and 5B are sectional views of typical bridge cutting jigs, while FIGS. 6A and 6B are sectional views showing the configuration and operation of the bridge cutting jigs in accordance with the present invention.

As shown in the drawings, the bridge cutting jig 21 of this invention is spring-biased and primarily inserted into the guide slot 20a of the bridge cutting mold 20 with both sides of the both sides of the front edge 21a of the jig 21 being held by the slot 20a, so that the jig 21 is almost completely prevented from being unexpectedly moved inside the mold 20. Thereafter, the jig 21 is quickly and fully inserted into the mold 20. In such a case, the jig 21 smoothly slides while being separated from the side wall of the guide slot 20a, thus being almost completely free from frictional abrasion. Therefore, the jig 21 of this invention is effectively used for a lengthy period of time.

However, the typical bridge cutting Jig has the following problem. When the typical jig is primarily inserted into the bridge cutting mold, neither side or only one side of the jig is inserted into the guide slot 20a of the mold 20, so that the jig has to be brought into frictional contact with the side wall of the slot 20a when the jig is quickly and fully inserted into the mold 20. Therefore, the jig is exceedingly abraded or unexpectedly broken due to the frictional contact, so that it is impossible to use the jig for a lengthy period of time.

The bridge cutting mold 20 of this invention is changeably installed on the device, so that the bridge cutting mold 20 may be freely changed with another one in order to change the mold jig 21 with another jig capable of forming the bridge notches 1a having a desired width. When repeatedly notching the metal strip 1 using a small-sized jig 21 while precisely and finely moving the metal strip 1 through the bridge cutting mold 20, it is possible to form the bridge notches 1a, having an enlarged width, on the metal strip 1.

Figure 7A:
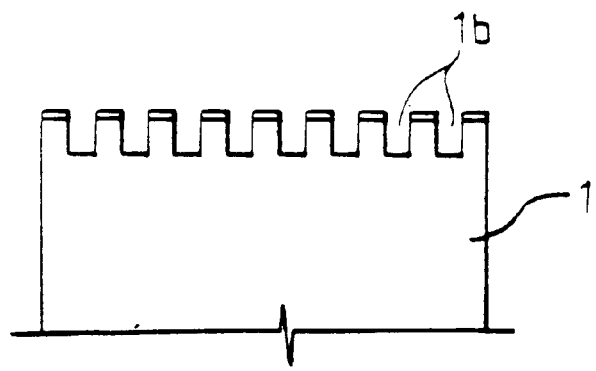
FIGS. 7A to 7C are views showing the examples of bridge notches formed on the sharpened edge of a metal strip by the bridge cutting jig of this invention.
Figure 7B:
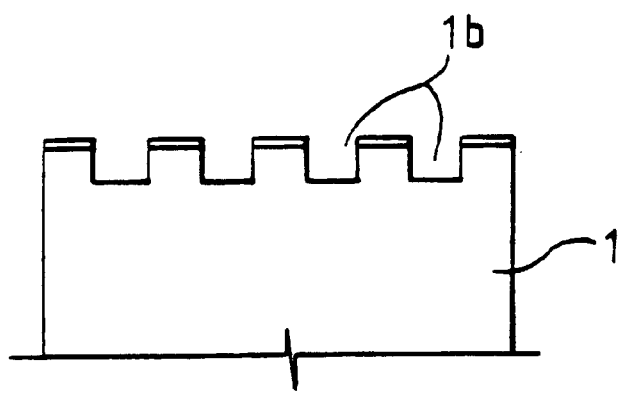
Figure 7C:
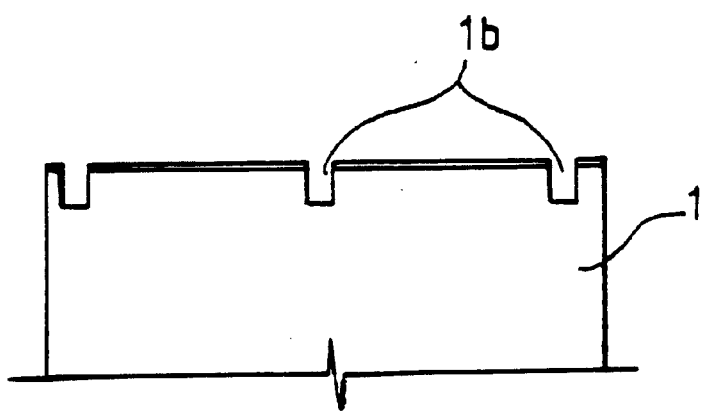

FIGS. 7A to 7C are views showing the configuration of strips 1, with different bridge notches 1b being formed along the sharpened edge of the strip 1 by different jigs of this invention through a punching process. In accordance with such a punching process using the jigs 21, a plurality of bridge notches 1b, having a predetermined width, are formed along the sharpened edge of the strip 1.

For example, such a strip 1, with the bridge notches 1b, is preferably used for forming a perforated line on a printed material, such as tickets or receipts. Of course, it is possible to adjust the gap between the perforations of the perforated line by controlling the punching interval of the jig during a punching process for the bridge notches 1b.

The device 100 of this invention is also provided with a unit for transversely forming a vertical bending slot on a side surface of the metal strip. In accordance with the preferred embodiments of this invention, such a bending slot 1d may be formed on a side surface of the metal strip 1 using a grinding wheel of FIG. 8 or a bite of FIG. 9. The construction and operation of the grinding wheel and the bite will be described hereinbelow.

Figure 10:
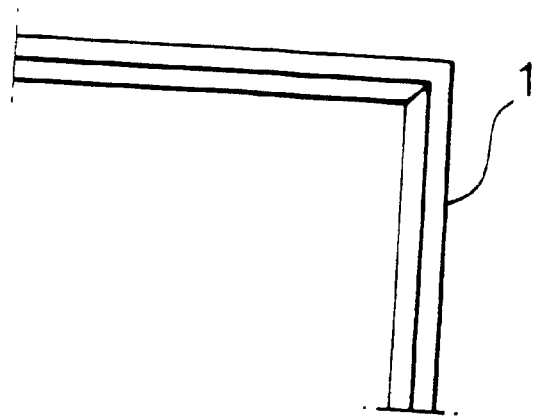
FIG. 10 is a plan view of a metal strip which is bent along a bending slot at right angles in accordance with this invention.
Figure 11:
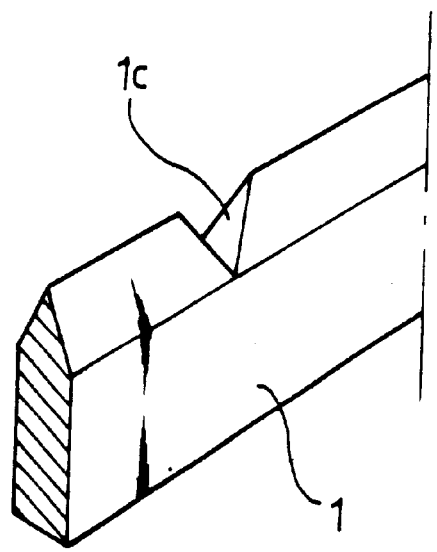
FIG. 11 is a perspective view of a metal strip having a V-notch at the sharpened edge in accordance with the invention.

FIG. 10 is a plan view of a metal strip 1 which is bent at right angles along a vertical bending slot 1d. FIG. 11 is a perspective view of a metal strip 1 having a plurality of regularly-spaced V-notches 1c on the sharpened edge, with one of the V-notches being shown in the drawing.

As shown in FIG. 11, a plurality of V-notches 1c may be regularly formed on the sharpened edge of the metal strip 1. A cutting blade, with such V-notches 1c, is preferably used for forming perforated lines on prints so as to form perforated paper or stamps with perforations being spaced at regular intervals of the V-notches 1c.

When it is necessary for the metal strip 1 with the V-notches 1c to be bent at an acute or obtuse angle, a bending slot 1d is instantaneously and transversely formed on a side surface of the metal strip 1 prior to precisely bending the strip 1.

Figure 8:
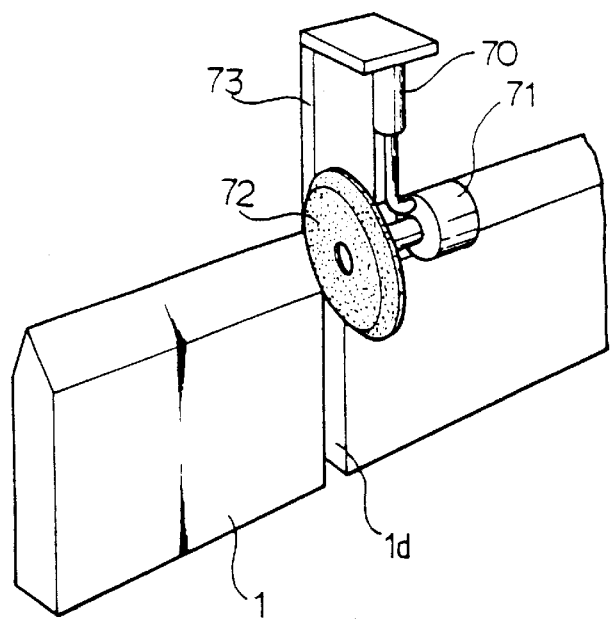
FIG. 8 is a perspective view showing a grinding wheel used for transversely forming a bending slot on a side surface of the metal strip in accordance with an embodiment of this invention.

In order to form such a bending slot 1d on the metal strip 1, the metal strip 1 is held by the guide blocks 2 in such a manner that the strip 1 is partially exposed outside the guide blocks 2 with a motor-operated up/down cylinder actuator 70 being positioned above a desired portion of the strip 1 as shown in FIG. 8. A stepping motor 71 is mounted to the piston shaft of the above cylinder actuator 70 and is selectively activated in accordance with an up/down motion of the piston shaft of the above cylinder actuator 70. A grinding wheel 72 is fixedly fitted over the drive shaft of the stepping motor 71 and is used for transversely forming such a bending slot 1d on a side surface of the strip 1. The above grinding wheel 72 is also used for forming the V-notches 1c on the sharpened edge of the metal strip 1.

The above up/down cylinder actuator 70 is held by a support column 73 which integrally extends from the table 10 so as to be positioned just above the guide blocks 2. The cylinder 70 is controlled by a control program.

The above stepping motor 71 is mounted to the piston shaft of the cylinder 70 at right angles, so that the motor-operated grinding wheel 72 selectively forms the V-notches 1c on the sharpened edge or the bending slot 1d on the side surface of the metal strip 1.

Of course, such V-notches 1c may be formed by a mold (not shown), having the same configuration as that of the V-notch 1c, in place of the grinding wheel 72. In such a case, the bending slot 1d may be formed by a separate cutting means.

Figure 9:
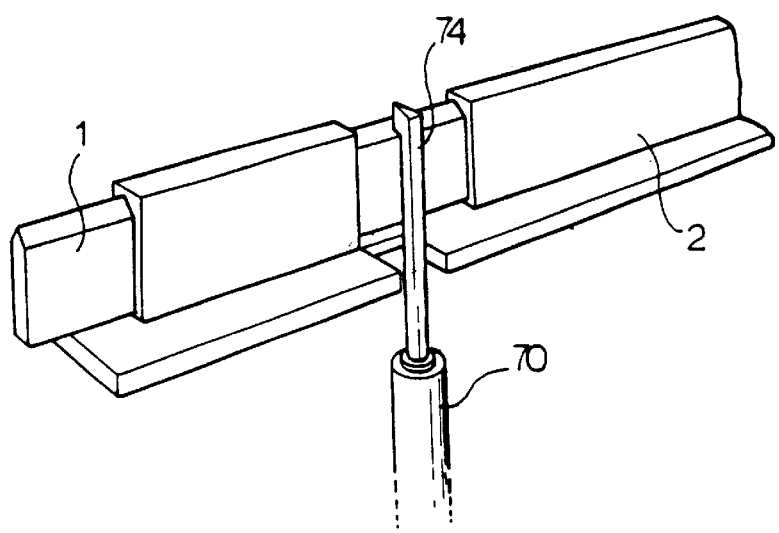
FIG. 9 is a perspective view showing a bite used for transversely forming a bending slot on a side surface of the metal strip in accordance with another embodiment of this invention.

In accordance with another embodiment of this invention, a bite 74 is axially mounted to the up/down cylinder actuator 70 in place of the grinding wheel 72 as shown in FIG. 9. The above bite 74 transversely forms a bending slot 1d on a side surface of the metal strip 1 in accordance with an up/down motion of the cylinder actuator 70.

Figure 12A:
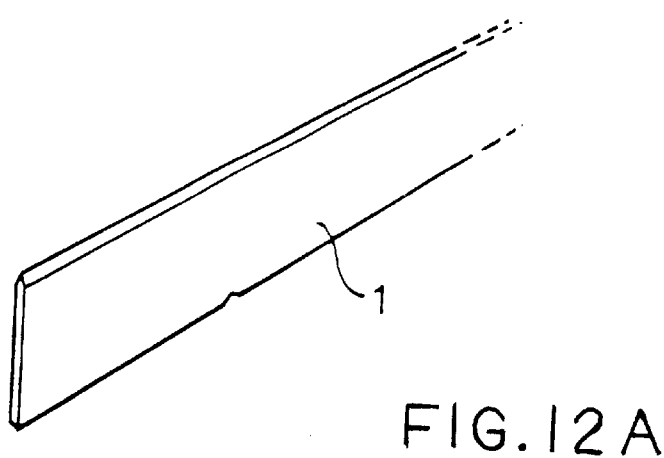
FIGS. 12A to 12C are perspective views individually showing the lower edge of a metal strip, which is gradually deformed due to at least one marking slot typically formed on the lower edge of the metal strip in order to form a bending point on the metal strip prior to manually bending the metal strip.
Figure 12B:
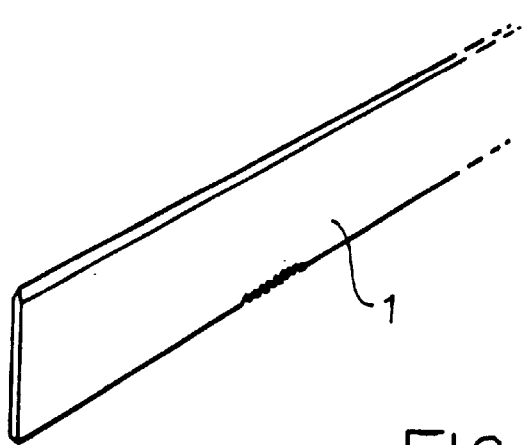
Figure 12C:
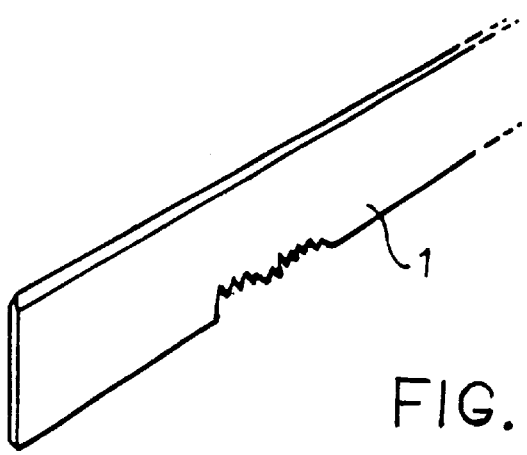
Figure 13:
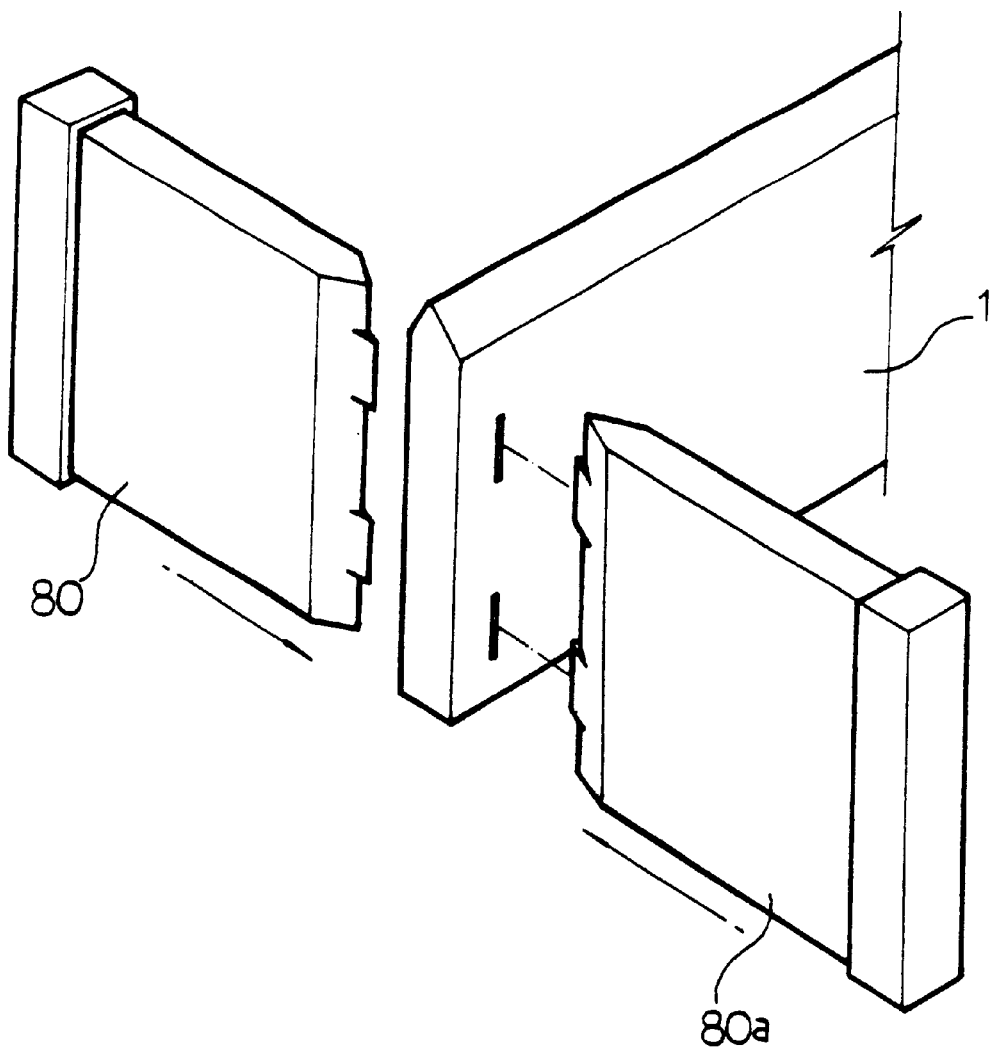
FIG. 13 is a perspective view showing the operation of two marking jigs used for forming a plurality of bending points on both side surfaces of a metal strip in accordance with the present invention.

FIGS. 12A to 12C show the lower edge of a metal strip which is gradually deformed due to marking slots formed on the lower edge of the metal strip in order to form a bending point on the strip in the prior art. FIG. 13 shows the operation of two marking jigs used for forming a plurality of bending points on both side surfaces of a metal strip in accordance with the present invention.

As well known to those skilled in the art, a marking process is for forming a bending point on a metal strip 1 prior to a manual bending process. That is, when it is necessary to precisely bend a metal strip 1 into a desired configuration, the bending process is not performed by a bending machine, but is preferably performed manually. In order to manually bend the metal strip 1, at least one bending point has to be formed on the strip 1 prior to performing a bending process. In the prior art, a marking slot is formed on the lower edge of the metal strip 1 by a jig as shown in FIG. 12A, thus forming a bending point on the strip 1. However, in the prior art, a plurality of marking slots may be sometimes concentrated on the lower edge of the metal strip 1 as shown in FIGS. 12B and 12C and this allows the lower edge of the metal strip 1 to be exceedingly deformed or distorted. However, such a problem is almost completely overcome by the device of this invention which forms two bending points on each side surface of the metal strip 1 by the marking jigs of FIG. 13. As shown in FIG. 13, two removable marking jigs 80 and 80a, individually operated in conjunction with a cylinder actuator, are positioned at both sides of the metal strip 1 so as to be directed toward the strip 1. The two numerically controlled jigs 80 and 80a are selectively biased toward the metal strip 1 by biasing pins. The biasing pins are individually operated in conjunction with a cylinder actuator, so that the biasing pins quickly push the jigs 80 and 80a onto both sides of the strip 1. Each of the two marking jigs 80 and 80a thus forms two bending points on each side surface of the metal strip 1 without deforming or distorting the metal strip 1.

Figure 14:
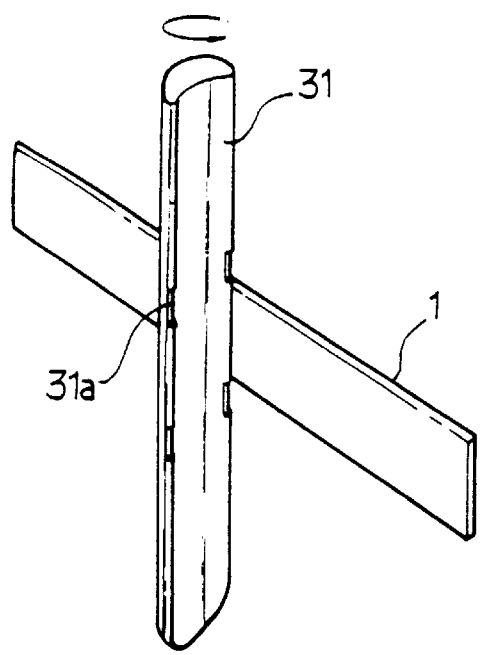
FIG. 14 is a perspective view showing the operation of a movable bending pin used for bending the metal strip into a desired configuration in accordance with the invention.
Figure 15:
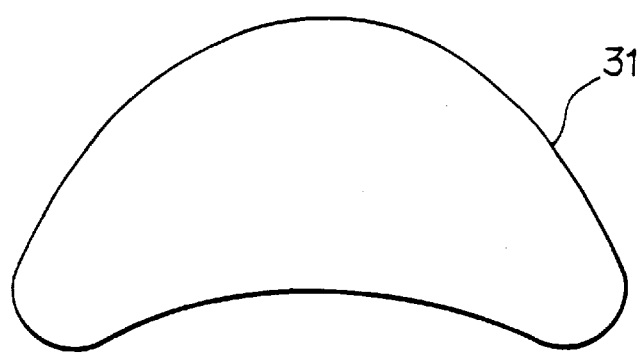
FIG. 15 is a view showing the cross-section of the bending pin of FIG. 14.
Figure 16:
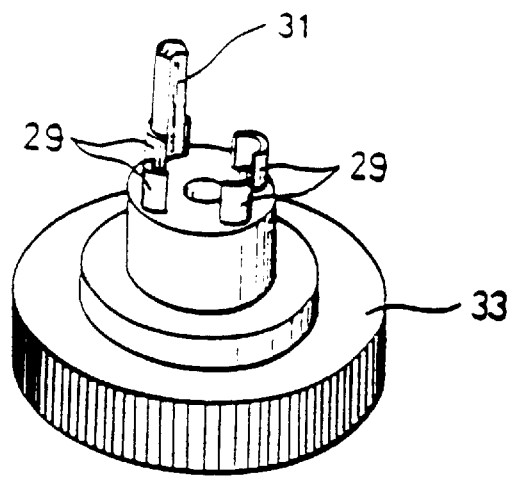
FIG. 16 is a perspective view of a first gear used for holding and operating the bending pin of FIG. 14.
Figure 17:
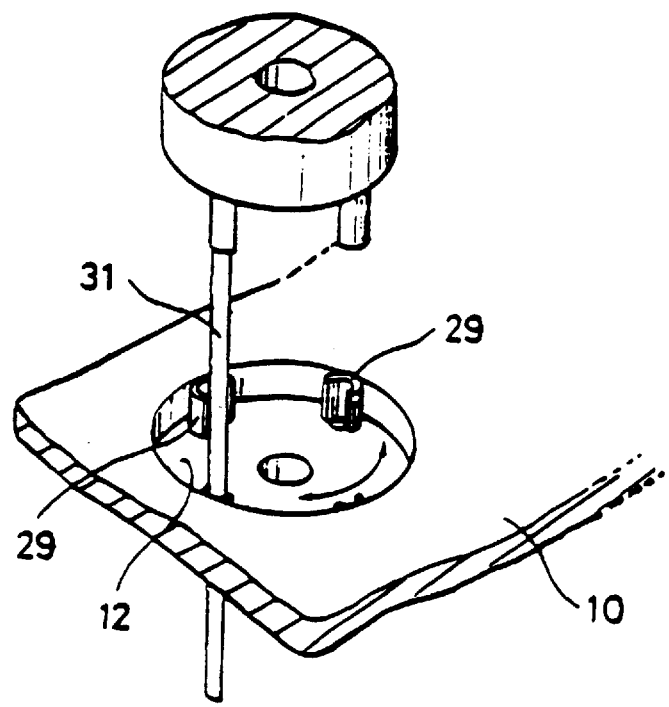
FIG. 17 is a perspective view showing the arrangement of first and second gears for the bending pin of this invention.

FIG. 14 is a perspective view showing the configuration of a guide bending pin used for bending the metal strip 1 into a desired configuration in accordance with the present invention. FIG. 15 is a plan view showing the cross-section of the bending pin of FIG. 14. FIG. 16 is a perspective view of a first gear with both the bending pin and a pin protecting guide. FIG. 17 is a perspective view showing the operation of the above bending pin.

As shown in FIGS. 2, 16 and 17, an opening, preferably a circular opening 12, is formed on the table 10 at a position under the bending block 4. The first gear 33 with a bearing 32 is rotatably positioned just under the opening 12, while a second gear 33a with a bearing 32a is positioned above the opening 12 so as to be opposite to the first gear 33.

The first and second gears 33 and 33a individually have a pin insert hole 33b at a corresponding position while the bending pin 31 is movably inserted into the pin insert hole 33b of the first gear 33. Of course, the pin 31 is also inserted into the pin insert hole 33b of the second gear 33a, thus being movably held by the two gears 33 and 33a at the top and bottom portions. A pin guider 29, having both a semicircular cross-section and a height corresponding to the width of the metal strip 1, is provided at each of the pin insert holes 33b.

The pin guiders 29 guide the vertical movement of the bending pin 31 while protecting the pin 31 from being unexpectedly bent or broken during a bending process.

One of a plurality of the pin insert holes 33b and semicircular pin guides 29 may be provided depending on the number of the bending pin 31. Since the size of the bending pin 31 can be selected in accordance with the extent of bending and the width or height of material of the metal strip, the bending can proceed easily. There are preferably 2 to 4 bending pins.

As best seen in FIGS. 14 and 15, the bending pin 31 has a specifically rounded cross-section or a generally semicircular cross-section with opposite side surfaces being convex and concave, respectively. The above bending pin 31 is positioned in a way such that the pin 31 comes into contact with the metal strip 1 at either of opposite rounded corners between the convex and concave surfaces.

Two notches 31a are formed along each rounded corner of the pin 31. When the pin 31 comes into contact with the metal strip 1 during a bending process, the two notches 31a are positioned around the upper and lower edges of the metal strip 1, thus allowing the rounded corner to be brought into close contact with the side surface of the metal strip 1 at the intermediate portion between the two notches 31a. Therefore, the bending pin 31 is free from giving any damage to the sharpened edge of the metal strip 1 when the rotating pin 31 pushes the metal strip 1 during a bending process.

Due to the above notches 31a, the bending pin 31 uniformly pushes the metal strip 1 and is easily and precisely positioned relative to the strip 1.

The lower end of the bending pin 31 is connected to the piston of a cylinder actuator 34 which is fixed to the lower end of the first gear 33, so that the pin 31 is movable upward by the cylinder actuator 34. That is, when the pin 31 is operated by the actuator 34, the pin 31 is projected upward from the opening 12 and is inserted into the pin insert hole 33b of the second gear 33a. The bending pin 31 is thus firmly held by the two gears 33 and 33a.

Sometimes, the pin insert hole 33b of the second gear 33a may fail to be precisely aligned with the pin insert hole 33b of the first gear 33. In such a case, the position of the pin insert hole 33b of the second gear 33a has to be adjusted and this is easily accomplished by appropriately moving a gear box of the second gear 33a to the front, back, left or right.

In order to allow the bending pin 31 to be rotatable in opposite directions, the first and second gears 33 and 33a are individually connected to a drive gear 35 or 35a of the reversible stepping motor 30 through a belt. The two gears 33 and 33a are thus rotatable at the same speed and at the same time. The above stepping motor 30 is provided on the bottom surface of the device 100 as described above. Of course,-both the motor 30 and the cylinder actuator 34 are operated under the control of a computer.

When the metal strip 1 is distributed from the strip roll unit through the two guide blocks 2, the bending pin 31 is rotated in conjunction with the first and second gears 33 and 33a at a position around the bending nozzle 4a of the bending block 4a of the bending block 4, thus bending the metal strip 1 into a desired configuration. When it is necessary to change the bending direction of the metal strip 1, the bending pin 31 moves downward prior to changing the position of the bending pin 31 relative to the metal strip 1. Thereafter, the bending pin 31 moves upward so as to come into contact with a selected surface of the metal strip 1.

As shown in FIG. 16, a plurality of bending pins 31 are provided so that an appropriate bending pin 31 in accordance with the bending angle and the width and height of the metal strip 1 can be selectively used. That is, in order to bend the metal strip 1 from the upper part of the bending nozzle 4 into a desired pattern, a first bending pin 31 with a suitable size is selected and moves vertically on the upper side of the bending nozzle 4 to conduct a bending process. After the first bending pin 31 moves downward, a second bending pin (not shown) or a third bending pin (not shown) are selected and operated in the same way as the first bending pin 31 under the control of the previously set computer program. in such a case, since the bending block 4 is movably set on the device 100, it is possible to adjust the gap ($\alpha$) between the bending block 4 and the bending pin 31 in accordance with the thickness of the metal strip 1. For example, when the metal strip 1 is relatively thinner than a reference strip, the bending block 4 moves forward so as to reduce the gap ($\alpha$) between the bending block 4 and the bending pin 31. On the other hand, when the metal strip 1 is relatively thicker than the reference strip, the bending block 4 moves backward so as to enlarge the gap. Such a movement of the bending block 4 for adjusting the gap ($\alpha$) may be easily understood from FIGS. 18 and 19.

Figure 20:
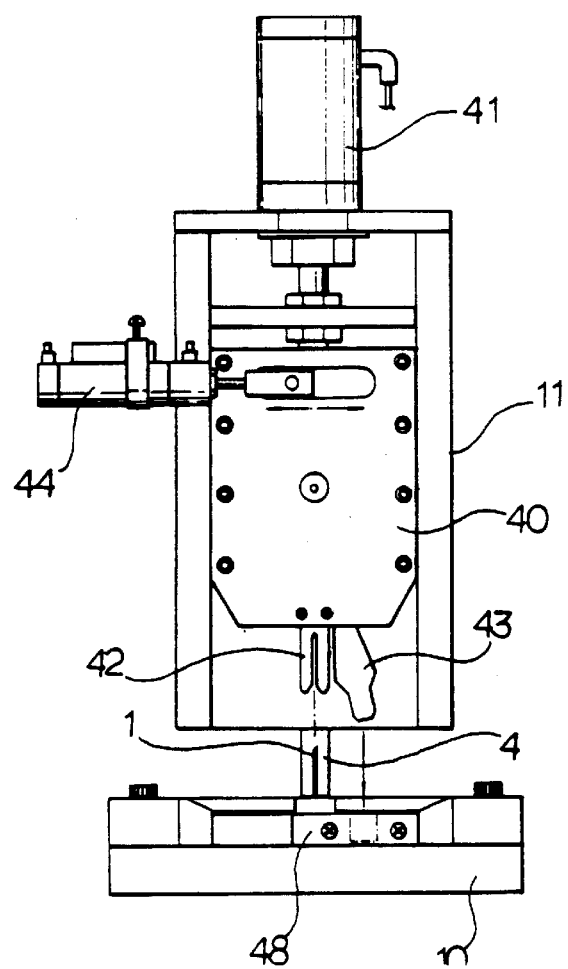
FIG. 20 is a front view showing the front portion of the device provided with both a strip holder and a swing cutter in accordance with the invention.
Figure 21:
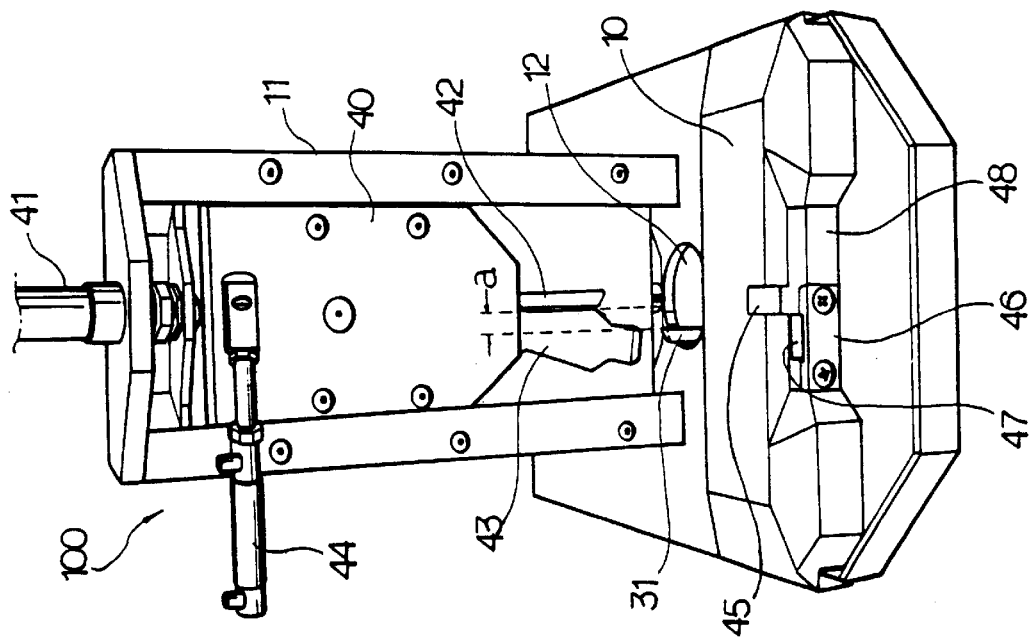
FIG. 21 is a view showing the operation of both the strip holder and the swing cutter of FIG. 20.
Figure 22:
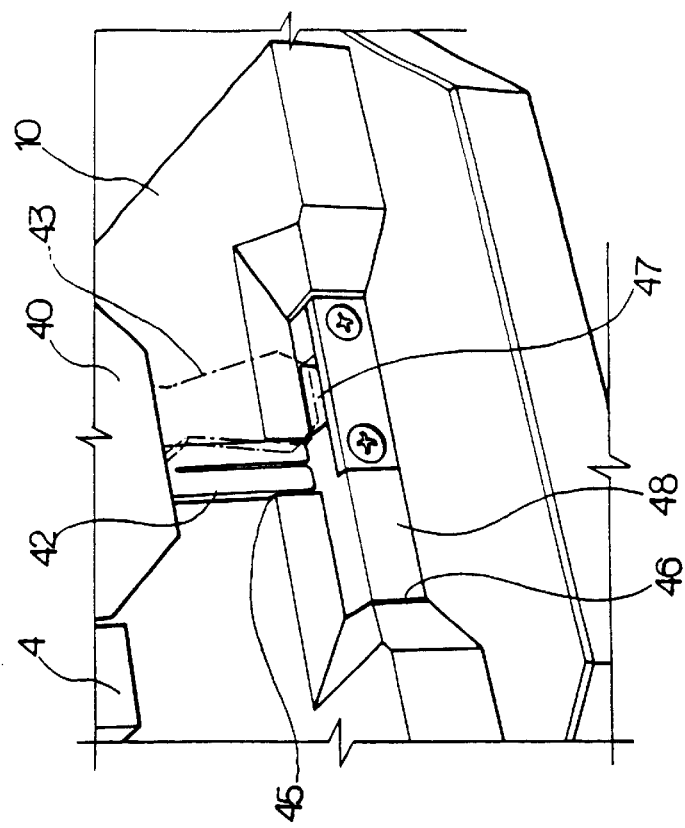
FIG. 22 is a view showing the front portion of a table provided with both the strip holder and the swing cutter of FIG. 20.

FIG. 20 is a front view of the device, showing both a strip holder and a swing cutter being used for holding and cutting the metal strip, respectively. FIG. 21 is a view showing the operation of both the strip holder and the swing cutter.

After the metal strip 1 is bent as described above, the metal strip 1 is cut into cutting blades by the device as follows.

The metal strip 1 from the bending process continuously moves to the front portion of the table 10. In such a case, a swing cutter 43 is moved to a desired cutting position where the cutter 43 cuts the metal strip 1 into cutting blades. The above swing cutter 43, which is positioned at the front of the bending block 4, is hinged to and rotatably held by the movable carrier 40. The above carrier 40 is slidably held by the two vertical guide rails. 11 at both side edges and is operated in conjunction with the first cylinder actuator 41, thus selectively and vertically sliding along the two rails 11 in opposite directions.

Figure 23:
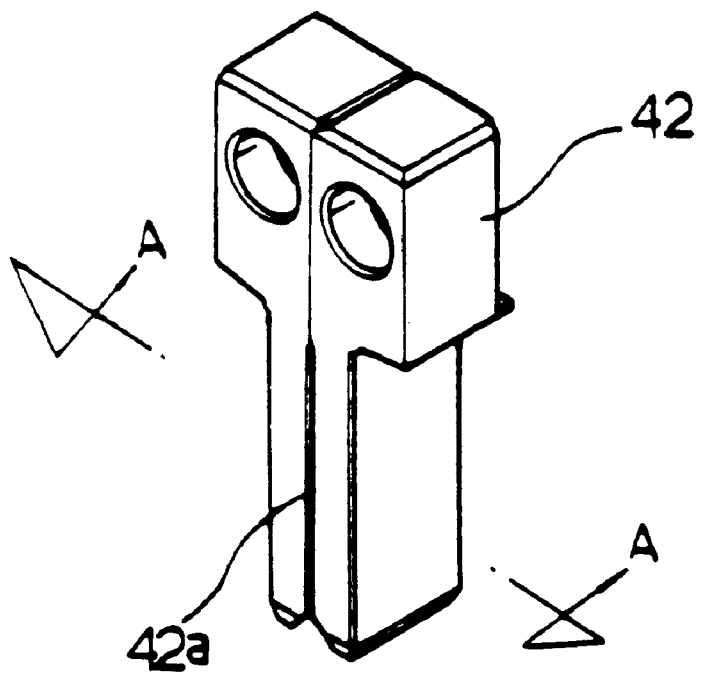
FIG. 23 is a perspective view of the strip holder of this invention.
Figure 24:
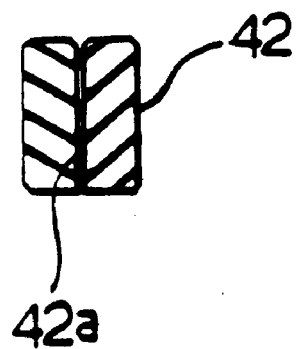
FIG. 24 is a cross-sectioned view of the strip holder taken along the line A—A of FIG. 23.

A removable strip holder 42, used for holding the metal strip 1, is provided at the lower edge of the carrier 40. FIGS. 23 and 24 are perspective and cross-sectioned views of the above strip holder 42, respectively.

The above strip holder 42 consists of two blocks, which have the same configuration and form a strip holding slit 42a between them when the two blocks are integrated into a single body. The above holder 42 is designed for adjusting the width of the strip holding slit 42a in accordance with the thickness of the metal strip 1.

That is, the strip holding slit 42a of the holder 42 is formed between the inside surfaces of the two blocks. The inside end or the web of the strip holding slit 42a is V-shaped, thus firmly holding the sharpened edge of the metal strip 1 without giving any damage to the sharpened edge of the strip 1. Both the above strip holder 42 and the bending block 4 form a set, so that the holder 42 is changeable along with the bending block 4.

The edge of the mouth of the strip holding slit 42a is chamfered, so that it is possible to effectively guide the metal strip 1 into the slit 42a without failure even when the strip 1 from the bending nozzle 4a fails to be precisely aligned with the slit 42a.

Figure 27A:
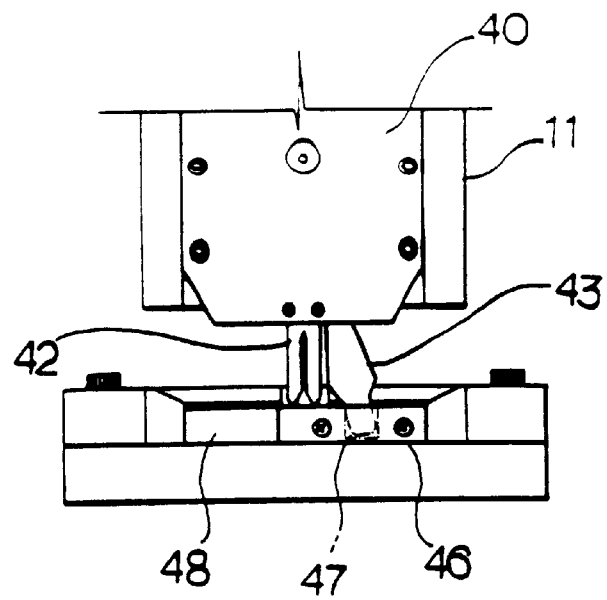
FIGS. 27A and 27B are views showing the operation of the swing cutter of this invention.
Figure 27B:
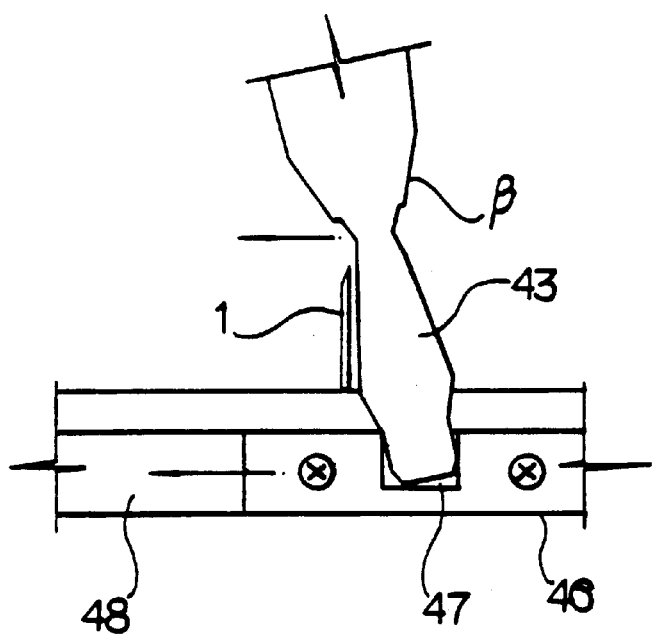

In such a case, the swing cutter 43 is rotated by the second cylinder actuator 44, thus being temporarily held in a cutting process waiting position at a side of the strip holder 42 and moves downward along with the carrier 40 as shown in FIGS. 27A and 27B. In such a case, the movable piece 48, which is positioned in the front of the slot 45 of the table 10, horizontally moves so as to hold the lower end of the swing, cutter 43 in the locking slot 47.

The swing cutter 43, which is firmly held by the locking slot 47 of the movable piece 48, is allowed to precisely cut the metal strip 1. That is, when it is necessary to cut the strip 1 into cutting blades, the movable piece 48 is operated by the cylinder actuators, so that the piece 48 slides in the guide groove 46 in opposite directions with the swing cutter 43 finely and precisely cutting the metal strip 1. Of course, the swing cutter 43 may be moved to the bending process waiting position under the control of a proximity or photo sensor, which checks the finally bent portion of the metal strip 1 prior to outputting a start signal to the cylinder actuator for the cutter 43.

FIGS. 25 and 26 are views showing the configuration of the swing cutter 43 of this invention. As shown in the drawings, the lower portion of the cutter 43 narrows in the middle with an inclined cutting surface 43a, thus forming a narrow waist. The above cutting surface 43a is inclined at an angle of 8. When the swing cutter 43 is rotated so as to cut the metal strip 1, the cutter 43 primarily comes into contact with the lower portion of the metal strip 1 at the cutting surface 43a, so that the cutter 43 cuts the metal strip 1 from the lower to the upper edge of the strip 1. Therefore, the swing cutter 43 finely and perpendicularly cuts the metal strip 1 without failure.

That is, when the metal strip 1 is cut from the upper to the lower edge by the swing cutter, the strip 1 is biased downward in the strip holder 42 by the cutting force of the swing cutter 43, so that the holder 42 fails to firmly hold the strip 1 and this allows the strip 1 to be unexpectedly and inclinedly cut. Meanwhile, when the metal strip 1 is cut from the lower to the upper edge by the swing cutter 43 as described above, the strip 1 is biased upward, thus being more firmly held by the strip holder 42 and being finely and perpendicularly cut at one time.

Figure 28:
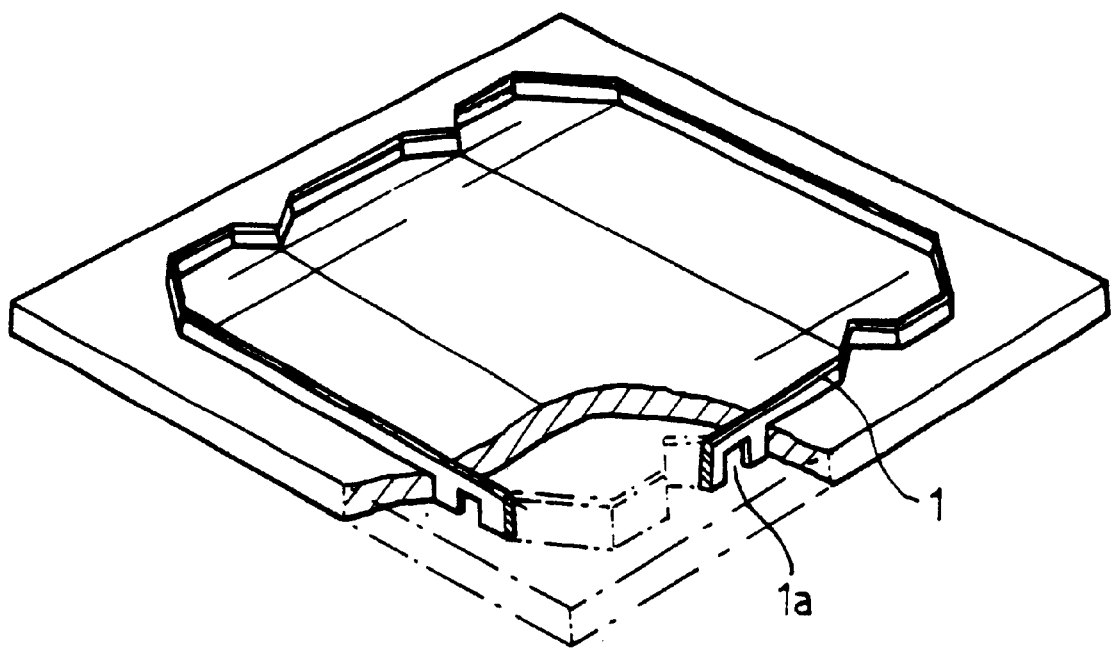
FIG. 28 is a perspective view of a wood block provided with a cutting blade produced by the device of this invention.

FIG. 28 is a view showing two or more cutting blades, which are produced by the device of this invention and are set on a flat wood block. As shown in the drawing, when two or more cutting blades are set on a wood block with ends of the blades closely meeting each other at right angles, a gap may be formed at the junction between the cutting blades 1 due to the sharpened edges of the blades 1. That is, a gap may be formed between one end of a blade and the inclined surface of the sharpened edge of another blade. Such a gap may reduce the cutting quality of the cutting blade, so that it is necessary to remove such a gap from the cutting blades set on the wood block. In order to remove such a gap from the junction between the cutting blades, a cutting blade 1, of which the end meets the side surface of another blade 1, is precisely machined at the end in order to form a tip capable of substantially meeting the inclined surface of the sharpened edge of the other blade 1. Therefore, any gap is removed from the junctions between the cutting blades 1 which are commonly set on a wood block.

Industrial Applicability

As described above, the present invention provides a device for forming a cutting blade for prints. The blade forming device of this invention forms cutting blades by appropriately bending and cutting a metal strip into desired blades through integrated work regardless of a difference in the size of metal strips. The device is also provided with changeable jigs, thus being capable of forming bridge notches having different intervals and configurations. The device has one vertically movable bending pin and one swing cutter. The bending pin is capable of quickly bending a metal strip into a desired configuration, while the swing cutter finely and precisely cuts the metal strip into cutting blades.

Another advantage of this invention resides in that the device quickly produces high precision cutting blades, thus improving productivity and reducing the cost of the cutting blades.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A guide block for guiding and supporting a metal strip, comprising two plates oppositely analyzed and each having a surface facing each other with an elongated fitting channel; and a bending block having a nozzle with surfaces that surround and guide the metal strip, the bending block being held by and between the two plates that has one side fitted into one of the elongated channels and another side fitted into the other of the elongated channels, the bending block having a guide sized to accommodate receiving the metal strip to guide same, each of the two plates having an associated configuration that defines the elongated fitting channel that has plate engagement surfaces configured to complement bending block engagement surfaces of the bending block such that as the one side of the bending block is fitted into one of the elongated channels and the other side is fitted into the other of the elongated channels, the channel engagement surfaces engage the bending block engagement surfaces in a complementary manner.

2. A guide block as in claim 1, wherein said nozzle is at an end of said bending block and whose size and configuration is compatible with accommodating a size and configuration of the metal strip.

3. A guide block as in claim 1 in combination with a bending pin, a cylinder actuator with a piston that is movable, a first gear fixed to a lower end of the cylinder actuator, and a second gear, the first and second gears being spaced apart from each other and each having a respective pin insert hole that is in alignment with each other, the bending pin being movable in unison with the piston so as to move between an engaged position, where the bending pin extends from the pin insert hole of the first gear to engage with the pin insert hole of the second gear, and a withdrawn position, where the bending pin is out of engagement with the second pin insert hole and spaced away from the second gear, the bending pin and the bending block being arranged to cooperate with each other while the bending pin is in the engaged position to enable the bending pin to rotate relative to the bending pin in response to rotation of the first and second gears so as to enable a portion of the metal strip to bend that is guided between the bending pin and the bending block.

4. A combination as in claim 3, further comprising a gear box containing the second gear, the gear box being movable in front, back, left or right directions to adjust a relative position of the pin insert hole of the second gear with respect to the pin insert hole of the first gear to enable alignment of the pin insert holes of the first and second gears with each other.

5. A guide block as in claim 1, wherein said nozzle is at an end of said bending block, said bending nozzle being configured to taper in an outward direction.

6. A method of guiding and supporting a metal strip, comprising;

arranging two plates opposite each other, each having an elongated fitting channel at an inside surface thereof that is defined by a configuration having plate engagement surfaces, providing a bending block having a nozzle with surfaces that surround and guide the metal strip, holding the bending block between the two plates by fitting one side of the bending block into one of the elongated fitting channels and another of the sides into the other of the elongated fitting channels as the plate engagement surfaces engage bending block engagement surfaces in a complementary manner with each other; and guiding the metal strip into a guide of the bending block.

7. A method as in claim 6, further comprising sizing the nozzle based on a size and configuration of the metal sheet and arranging the nozzle at an end of the bending block.

8. A method as in claim 6, further comprising:

supplying the metal strip through the guide to an area between a bending lock and bending pin;

adjusting a size of a gap between the bending block and the bending pin to accommodate a thickness of the metal strip by moving the bending block back or forth so that the gap is sized to accommodate a thickness of the metal strip; and rotating the bending pin with respect to the bending block to bend the metal strip that is in the area between the bending block and the bending pin by pressing the metal strip against the bending block.

9. A method as in claim 6, further comprising arranging the nozzle at an end of said bending block and configuring the nozzle to taper in an outward direction.

* * * * *